United States Patent [19]

Palgrave et al.

[11] Patent Number: 4,482,372

[45] Date of Patent: Nov. 13, 1984

[54] FLUID FERTILIZER COMPOSITION

[75] Inventors: Derek A. Palgrave, Doncaster; Frederick A. Waite, Farnham Common; James D. Birchall, Chester, all of England; John Cooper; James A. Enever, both of Kilmarnock, Scotland

[73] Assignee: Imperial Chemical Industries PLC, Hertfordshie, England

[21] Appl. No.: 452,497

[22] Filed: Dec. 23, 1982

Related U.S. Application Data

[60] Continuation of Ser. No. 227,412, Jan. 22, 1981, abandoned, which is a division of Ser. No. 44,161, May 31, 1979, Pat. No. 4,265,406.

[30] Foreign Application Priority Data

Mar. 30, 1979 [GB] United Kingdom ................. 7911207

[51] Int. Cl.$^3$ ................................................ C05B 7/00
[52] U.S. Cl. .......................................... 71/35; 71/36; 71/51; 71/64.08; 71/53; 241/16
[58] Field of Search ............. 71/36, 35, 34, 51, 64.08, 71/64.10; 241/16, 21; 149/46, 109.6, 112; 264/3 D; 23/300, 293 R, 293 A; 423/396, 367, 166

[56] References Cited

U.S. PATENT DOCUMENTS 3,113,858 12/1963 Slack et al. ......................... 71/64.08
4,069,034 1/1978 Hoover ............................. 23/300 X

FOREIGN PATENT DOCUMENTS 2455005 5/1975 Fed. Rep. of Germany ........ 241/21
2362099 4/1978 France ............................. 71/64.08
1449268 9/1976 United Kingdom .

OTHER PUBLICATIONS

NFSA Liquid Fertilizer Manual; Published by NFSA, Peoria, Ill., 1967; p. 18-10.

Primary Examiner—Kenneth M. Schor
Attorney, Agent, or Firm—Cushman, Darby & Cushman

[57] ABSTRACT

A fluid fertilizer composition based essentially on potassium chloride and an ammonium phosphate prepared by a process which comprises comminuting a solid substance containing potassium chloride and ammonium phosphate by grinding in the presence of a saturated solution of solid in a liquid in which the solid has a solubility greater than 1% by weight, the mixture of the solution and the solid being in fluid condition with the solid being a separate phase during grinding and the solution having dissolved therein an additive which is a crystal growth inhibitor for the solid whereby crystal growth is inhibited at both existing crystal surfaces and new crystal surfaces created by the breaking down of relatively coarse particles.

4 Claims, No Drawings

FLUID FERTILIZER COMPOSITION

This is a continuation of application Ser. No. 227,412 filed Jan. 22, 1981 (now abandoned) which was a division of application Ser. No. 44161 filed May 31, 1979 now U.S. Pat. No. 4,265,406.

This invention relates to the comminution of a solid material in the presence of a saturated solution of the material in an inert liquid, in order to reduce the particle size of the solid material.

It is, of course, already known to grind solid, usually crystalline, materials in order to reduce coarse fragments or particles thereof to a finer state of subdivision, typically to particles of 0.1–10 micron size range, and thereby increase the surface area of a given weight or volume of the material. Such procedures may be carried out in the dry condition, but more commonly a wet grinding process is employed in which the solid material is treated in an apparatus such as a ball mill, a sand mill or a pebble mill in the presence of a suitable liquid. In the majority of cases, the liquid chosen is one which does not dissolve the solid to any significant extent. There are instances, however, where it is required to reduce the particle size of a solid material in the presence of a liquid in which the solid in question has a significant of substantial solubility (the proportion of solid to liquid being, of course, greater than is required merely to saturate the liquid with respect to it). In practice it is found that comminution of the solid under these circumstances leads to little or no useful reduction in the particle size. Even if the alternative procedure is adopted of producing the required fine particles by some other method (e.g. dry grinding) and then introducing these fine particles into a saturated solution of the same solid in the relevant liquid, it is found that there is a progressive increase in the size of the particles as the result of a spontaneous crystal dissolution-recrystallisation process.

We have now found that these difficulties may be minimised or overcome if the comminution of a solid material in a saturated solution of the material in a solvent liquid is carried out in the presence of certain additives.

According to the present invention, there is provided a process wherein a solid material is comminuted in the presence of a saturated solution of the solid in a liquid in which the solid has a solubility greater than 1% by weight, and also in the presence of an additive which is at least partly dissolved in the said saturated solution and is capable of at least partially inhibiting re-growth at both existing crystal surfaces and new crystal surfaces produced by the comminution operation.

The process may be applied to any solid material which can be comminuted or reduced in particle size by the use of grinding apparatus such as those referred to above and which is soluble in the liquid in the presence of which it is treated to the extent of more than 1% by weight. The difficulties which have been referred to above are in general apparent where the solubility of the solid material in the liquid is greater than 1% by weight and especially where it is greater than 10% by weight. Instances where these conditions apply occur, for example, in the fields of slurry explosives and liquid fertilisers.

The process is pre-eminently suitable for the comminution of water-soluble solid materials in the presence of their saturated aqueous solutions. Examples of such water-soluble materials include salts such as ammonium nitrate, sodium nitrate, calcium nitrate, potassium chloride, sodium chloride, ammonium phosphate, ammonium polyphosphate, potassium hydrogen phosphate and disodium hydrogen phosphate, and non-salt-like compounds such as urea.

The ratio of the amount of solid material to be comminuted to the amount of saturated solution employed may vary widely according to requirements. There is no lower limit to the ratio, beyond the requirement that there must be present at least a tangible amount of the solid over and above that which is in the dissolved state, so that a separate solid phase exists. Likewise, there is no absolute upper limit to the ratio; in practice there may be a limit imposed by the need to maintain the total charge undergoing comminution in a sufficiently fluid condition for the process to be effective.

The procedure employed in the comminution process may vary according to the type of product required and its end use. Thus, where the desired product is a dispersion of the finely ground, solid material in its saturated solution in the liquid concerned, as, for example, in the case of a fluid fertiliser composition, the procedure followed may be to introduce each fresh batch of the solid into the mill or other grinding apparatus together with the liquid and the additive so that initially sufficient of the solid dissolves in the liquid to produce the required saturated solution. Alternatively, a saturated solution of the solid material in the liquid may be prepared in a previous step and this is then introduced into the mill along with the solid material to be comminuted and the additive. Where, on the other hand, the desired product is the solid material in essentially dry, finely divided form, it may be preferred to separate the comminuted solid and the liquid phase from a first grinding operation and then recycle the saturated liquid with further solid material in a subsequent grinding operation, so keeping losses of solid by dissolution into the liquid to a minimum. An example of the latter procedure is the comminution of ammonium nitrate in its saturated aqueous solution in the presence of sodium carboxymethylcellulose; on completion of the grinding operation, the finely divided ammonium nitrate settles out and can be separated for use in a slurry explosive, whilst the clear supernatant liquid can be recycled for the comminution of a fresh batch of ammonium nitrate.

As stated above, an essential constituent of the mixture which is submitted to the comminution process is an additive which is capable of at least partially inhibiting re-growth at both existing crystal surfaces and new crystal surfaces created by the breaking down of relatively coarse particles, and which is at least partly dissolved in the saturated solution of the solid material in the liquid. The nature of the additive will vary appreciably according to the solid material which is being comminuted, a number of different classes to compound possessing the necessary capability of interfering with the crystal growth process by modifying the transport of molecules or ions at the interface between the crystal and the saturated solution liquid phase. It will be understood that the additive may be either freely soluble or soluble only to a limited degree in the saturated solution, as the case may be; thus there may be more of the additive present in total than will actually dissolve in the saturated solution of the solid material.

One class of additive which has been found particularly useful in the process of the invention consists of the polysaccharides, more particularly those polysaccharides which contain an ionic component in the molecule, such as polysaccharides in which at least a proportion of the hydroxyl groups have been converted to carboxyl groupbearing substituents. A preferred additive for the comminution of ammonium nitrate is sodium carboxymethyl cellulose having a molecular weight in the range 5000–300,000.

Other polysaccharides are well known to those skilled in the art, and we would mention as examples the substituted starches, pectates, alginates, carragheenates, gum arabic, guar gum and xanthan gum.

Another class of additives which has been found particularly useful in the process of the invention consists of the long chain aliphatic amines or their salts. This class of additives is exemplified by the "ARMEEN", "DUOMEEN", "ARMAC" and "DUOMAC" products (Registered Trade Marks) made by Armour Hess (Akzo Chemie). These compounds are aliphatic long chain primary, secondary or tertiary amines of chain length typically between 6 and 18 carbon atoms, e.g. dodecylamine, or salts thereof, such as the acetates or oleates.

Yet another type of additive which is useful in the process embraces a variety of low molecular weight, inorganic salts. The suitability of an additive of this type tends to be rather more specific with respect to the solid material being comminuted than is the case with the organic additives mentioned above, and it is conjectured that its effectiveness depends upon certain crystal lattice parameters of the additive being similar in magnitude to, although not identical with, those of the solid material in question. As a consequence, the molecules or ions of the additive can, through steric and/or polar effects, disrupt that growth of the crystal lattice of the solid material being comminuted which can lead to the re-combination of freshly created surfaces. For the comminution of potassium chloride and/or sodium chloride in the presence of their saturated aqueous solutions, which is of particular interest for the production of fertiliser compositions in which one or both of these substances predominate as the active constituent, we have found that useful additives include the ferrocyanides and ferricyanides of sodium or potassium, borax, cadmium chloride and lead chloride. For ammonium nitrate suspensions, useful inorganic additives include sodium hexametaphosphate and sodium metavanadate.

Examples of yet other additives which we have found satisfactory are polyacrylic acids and other carboxylated polymers; sulphonated mono-, bi- and poly-nuclear aromatic compounds, e.g. sodium methyl (and higher alkyl) naphthalene sulphonates; sulphonated dyes, e.g. sulphonated magenta, congo red, naphthyl blue-black; sulphonated polymers, e.g. sodium lignosulphonate; and aminated polymers, e.g. amine polysaccharide.

For the grinding of chlorates, perchlorates and sulphates, additionally long chain alkyl sulphonates or alkyl phosphates are preferred when a high degree of comminution is required.

The suitability of any particular additive in association with any chosen solid material which is to be subjected to the process of the invention may in general be determined by simple experiment. However, in the case of the low molecular weight inorganic compounds referred to above, it may be of assistance in selecting the appropriate additive to consult the Powder Diffraction File published by the Joint Committee for Powder Diffraction Standards in association with the A.S.T.M. Materials with similar crystallographic structures give rise to similar diffraction patterns when illuminated by X-rays. Potential additives may be selected by comparing their diffraction patterns with those of proven agents.

There may be used in the process, instead of a single additive, a mixture of any two or more of the above-described additives.

The concentration of the additive, or additive mixture, to be used may vary within wide limits, depending upon the particular solid material being comminuted, the fineness of particle size which is ultimately desired and, possibly, economic factors. In general, we find to be effective an amount of additive of at least 0.001% of the total weight of solid material present in the composition (i.e. including that dissolved in the liquid), preferably at least 0.05% of that weight. A typical range of concentrations useful in many cases is from 0.1% to 1% of the said total weight.

In some cases, for example where commercially available grades of polysaccharides are used, it may be necessary to take into consideration the purity of the additive with respect to the constituent which is active in the comminution process. This may in practice be as low as 40%, and the amount of such additive used must be adjusted accordingly; preferably additives are employed which have a purity of greater than 60%, more preferably greater than 80%. Any impurities present in the additive should not adversely affect the operation of the additive to any significant extent. The optimum concentration of any particular additive can, however, always be established by means of simple trial.

By the process of the invention it is possible to comminute certain solid materials to a very small particle size which is not attainable by the use of conventional dry or wet grinding procedures. For example, on the grounds of safety it is not possible to submit ammonium nitrate to either dry grinding or wet grinding in the presence of a non-solvent liquid (which would normally be organic in nature). Ammonium nitrate can safely be comminuted in the presence of water, but the crystal size cannot in practice be reduced below about 45 microns, for the reasons discussed above. However, when operating according to the process of the invention, particles of size 10 microns can readily be obtained and it is possible even to attain a diameter of 1 micron.

In the field of explosives compositions, the benefits of the invention are evident in a number of ways reflecting the enhanced fineness of particle size of the active constituent which is obtained. Thus, in slurry explosives based on ammonium nitrate, the advantages observed include higher velocity of detonation, smaller critical diameter, more stable bubbles, lower primer usage, improved gel structure, improved processing and improved emulsion stability, as compared with conventional compositions.

The value of the invention in the field of fertiliser compositions arises from the facts that frequently the handling and application of such materials is much facilitated if they can be supplied in fluid rather than in solid form, but that the saturation solubility of active constituents such as potassium chloride in water is too low to make it economical to apply them simply in the form of a solution. Concentrations of the active constituent well in excess of saturation can be reached by employing slurries in which the excess material is present in solid, particulate form, but such compositions present handling and storage problems arising from inadequate fluidity and the tendency for a hard sediment to form.

Such problems can be attributed to coarseness of the particulate material present, due either to an inadequate initial state of sub-division or to re-growth of larger crystals at the expense of smaller ones during storage. Fertiliser compositions made according to the present invention contain the solid disperse phase in a very finely divided state which persists on storage and by virtue of which the compositions are highly fluid so that they can readily be handled and applied. e.g. by spraying. In the case where there is a substantial density difference between the solid disperse phase and the liquid continuous phase, some settlement of solid may occur on standing but this settlement can nevertheless readily be re-dispersed by gentle agitation of the composition. This same advantage applies to slurry explosives, e.g. those based on ammonium nitrate, made according to the invention.

Other applications of the invention, where the final product is also required in the form of the dispersion of solid particles in liquid which is obtained directly from the process, include the production of sprayable pesticide formulations and of sodium chloride slurries for road de-icing, as well as the bulk delivery by pipe-line of inorganic salts in general at high solids contents. Practical instances where the solid particles may be separated from the liquid phase after grinding and may then be used in powder form include the subsequent transformation of slurry explosives to dry powder explosives.

The solid materials to which the process of the invention is applied may initially be in coarse particulate form, for example in the form of commercially supplied crystals in the size range 200–5,000 microns. Comminution of this material may be achieved by any of the known grinding or milling techniques such as are commonly used, for example, in the dispersion of pigments in aqueous or non-aqueous media in the course of paint manufacture. Thus ball-milling, sand-milling, bead-milling, rod-milling and pebble-milling may be employed; in each case the process is continued until the required reduction of size of the solid material has been achieved. Where the solid material is initially in very coarse form, a preliminary crushing step may be advantageous before comminution is commenced. If desired, the additive may be present during this crushing stage also.

The invention is illustrated by the following Examples. In Examples 1-11 inclusive, which show the application of the invention to the production of slurry explosive compositions, a small-scale grinding technique was used, as described below, which is convenient for the initial testing of the suitability of various solid materials, liquids and additives for use in the process of the invention.

Grinding was carried out in a ceramic ball-mill having a capacity of 1 liter. The mill dimensions were:
 Internal diameter 114 mm
 External diameter 140 mm
 Internal length 121 mm
 External length 176 mm
The 22 balls used were of stainless steel each 19 mm in diameter.

Using a set of motor driven rollers the mill was rotated at a fixed speed of 102 r.p.m. This speed corresponded to about 76% of the critical speed. (This is the theoretical speed at which the contents of the mill start to centrifuge calculated from the expression:

$$\text{critical speed} = \frac{76.5}{\sqrt{\text{int. dia. of mill in feet} - \text{diameter of balls}}}$$

Commercial grinding using ball-mills is usually carried out at 70–85% of the critical speed).

EXAMPLE 1

A mixture of 1 part of ARMEEN HT (1 mole part) and triethanolamine (1 mole part) was heated until molten. Oleic acid (2 mole parts) was added until the resultant mixture had a pH of 5.5. The mixture was cooled to a paste. 66.9 parts of ammonium nitrate, 5 parts of sodium nitrate, 10 parts of water and 0.5 part (all parts being by weight) of paste obtained as described above were milled for 90 minutes. Particles of ammonium nitrate of initial diameter 300–1,000 microns were reduced to 10–40 microns.

A slurry explosive was prepared having the following composition:

|  | Parts by weight |
| --- | --- |
| Milled product as above | 82.4 |
| Aluminium powder | 10.1 |
| Guar gum | 0.6 |
| Zinc chromate | 0.2 |
| Isopropyl nitrate | 6.7 |

The resulting explosive had a density of 1.41 gm/cm$^3$. When primed with a detonator having a base charge of 0.8 gm PETN it detonated.

Comparative Example A

A similar slurry explosive was prepared containing the same basic components but omitting the additive paste from the milling step.

Using ammonium nitrate of 50–100 micron average particle diameter, ground in the absence of the additive, the slurry obtained required a 4 gm Pentolite primer for detonation. Using ammonium nitrate of ca. 1200 micron average particle size, the slurry obtained required a 12 gm Pentolite primer for detonation.

The gel strength of the composition containing the mixture milled in the absence of the additive was inferior to that of the composition described in Example 1.

EXAMPLE 2

A mixture of 69.7 parts of ammonium nitrate, 5.0 parts of sodium nitrate, 10 parts of water and paste as obtained in Example 1 was milled as described in that Example.

A slurry explosive was prepared having the composition:

|  | Parts by weight |
| --- | --- |
| Milled mixture obtained as above | 85.2 |
| Ethylene glycol | 7.0 |
| Guar gum | 0.6 |
| Zinc chromate | 0.2 |
| Aluminium | 7.0 |

This resulting explosive had a density of 1.24 gm/cm$^3$ and detonated with a 4 gm Pentolite primer.

Comparative Example B

A slurry prepared having the same composition as in Example 2, but omitting use of the additive paste in the grinding step, yielded ammonium nitrate of about 50-100 micron particle size and this required 12-20 gm of Pentolite for detonation.

EXAMPLE 3

The following composition was ground for 40 minutes in the equipment described in Example 1.
- 2,000 gm ammonium nitrate
- 400 gm water
- 20 gm sodium alkylnaphthalene sulphonate (Petro AGS, supplied by Petrochemicals Inc., Fort Worth, Texas, U.S.A.)

The resulting product contained particles of ammonium nitrate of the order of 5 micron diameter.

In the absence of the sodium alkylnaphthalene sulphonate additive the nitrate particles could not be reduced below 45 micron diameter.

EXAMPLE 4

The following composition was ground for 40 minutes in the equipment described in Example 1.
- 2,000 gm ammonium nitrate
- 400 gm water
- 20 gm Dispex A40 (polyacrylic acid ex. Allied Colloids).

The resulting product contained particles of ammonium nitrate of the order of 7 micron diameter.

EXAMPLE 5

The following composition was ground for 40 minutes in the equipment described in Example 1.
- 2,000 gm ammonium nitrate
- 400 gm water
- 20 sulphonated magenta The resulting product contained particles of ammonium nitrate of the order of 5 micron diameter.

EXAMPLE 6

The following mixture was milled for 40 minutes in the equipment described in Example 1:
- 65.7 gm ammonium nitrate (300 micron)
- 10.0 gm calcium nitrate (ex. Norsk Hydro)
- 5.0 gm water
- 0.2 gm "ARMAC* T" (ex. Akzo Chemie)

The product, which contained ammonium nitrate particles of 25 micron diameter, was then mixed with the following:
- 6.3 gm isopropyl nitrate
- 12.0 gm atomised grade aluminium
- 0.6 gm guar gum
- 0.2 gm zinc chromate
(* Registered Trade Mark)

The extrudable explosive composition thus obtained had a density of 1.52 gm/ml. In a 51 mm diameter cartridge unconfined at 12° C. it detonated with 4 gm of Pentolite with a velocity of detonation of 3.7 km/s.

Similar material prepared as above but omitting the "ARMAC T" was not easily extruded and after storage for a few weeks failed to detonate in a 51 mm diameter cartridge unconfined with 28 gm of Pentolite.

EXAMPLE 7

The following mixture was milled for 40 minutes in the equipment described in Example 1:
- 80 gm ammonium nitrate (300 micron)
- 20 gm water
- 0.2 gm acid fuchsine (ex. BDH Chemicals)

The product contained ammonium nitrate particles of 17 micron diameter; it was then dried out to yield a powder consisting of particles of 35 micron diameter and containing 3% of water. The following ingredients were then mixed:
- 83 gm powder (obtained as described above)
- 7 gm atomised grade aluminium
- 10 gm isopropyl nitrate The resulting sensitised powder explosive had a density of 1.13 gm/ml. In a 32 mm diameter cartridge unconfined at 5° C. it detonated with a detonator containing 0.10 gm of lead azide and a base charge of 0.10 gm of pentaerythritol tetranitrate and gave a velocity of detonation of 3.5 km/s.

Material prepared as above but omitting the acid fuchsine additive gave after storage for a few weeks a product which detonated with a detonator containing 0.10 gm of lead azide and a base charge of 0.80 gm of pentaerythritol tetranitrate and gave a velocity of detonation of 2.8 km/s.

EXAMPLE 8

The following mixture was milled for 40 minutes in the equipment described in Example 1:
- 61.3 ammonium nitrate (300 micron)
- 10.0 gm calcium nitrate (ex. Norsk Hydro)
- 9.0 gm water
- 0.2 gm "ARMAC T"

The product contained ammonium nitrate particles of 20 microns diameter; it was then mixed with the following:
- 6.7 gm isopropyl nitrate
- 12.0 gm atomised grade aluminium
- 0.6 gm guar gum
- 0.2 gm zinc chromate The sensitised slurry explosive thus obtained had a density of 1.56 gm/ml and the ammonium nitrate particle size was 20 microns. In an 83 mm diameter cartridge unconfined at 10° C. it detonated with 12 gm of Pentolite.

Material prepared similarly but omitting the "ARMAC T" additive failed to detonate with 28 gm of Pentolite.

EXAMPLE 9

The following mixture was milled for 40 minutes in the equipment described in Example 1:
- 59.6 gm ammonium nitrate (300 micron)
- 10.0 gm calcium nitrate (ex. Norsk Hydro)
- 6.5 gm water
- 0.1 gm "ARMEEN* S" (ex. Akzo Chemie)

The product, which contained ammonium nitrate particles of 40 microns diameter, was then mixed with the following:
- 1.0 gm paint grade aluminium
- 6.0 gm filter grade aluminium
- 15.0 gm ethanolamine nitrate liquor (86% in water)
- 0.6 gm guar gum
- 0.2 gm zinc chromate
- 1.0 gm glass microspheres
* "ARMEEN" is a Registered Trade Mark.

The sensitised slurry explosive thus obtained had a density of 1.25 gm/ml and the ammonium nitrate particles were of 40 microns diameter. In a 32 mm diameter cartridge unconfined at 5° C. it detonated with a detonator containing 0.10 gm of lead azide and 0.80 gm of pentaerythritol tetranitrate and with a velocity of detonation of 3.2 km/s.

Material prepared similarly but omitting the "ARMEEN S" failed to detonate with 12 gm of Pentalite.

EXAMPLE 10

The following mixture was milled for 15 minutes in the equipment described in Example 1:
72.9 gm ammonium nitrate (300 micron)
14.4 gm water
There was then added:
0.4 gm sodium carboxymethyl cellulose (ex.ICI)
and milling was continued for a further 45 minutes. The product, which contained ammonium nitrate crystals of 20 microns diameter, was then mixed with the following:
5.0 gm paint grade aluminium
7.0 gm atomised grade aluminium
0.2 gm pre-gelled maize starch
0.5 gm self-crosslinking guar gum The aluminium-sensitised slurry explosive thus obtained had a density of 1.20 gm/ml. In a 32 mm diameter cartridge unconfined at 5° C. it detonated with a detonator containing 0.10 gm of lead azide and 0.10 g of pentaerythritol tetranitrate and gave a velocity of detonation of 3.5 km/s.

Material prepared similarly at ambient temperature, but ground without the sodium carboxymethyl cellulose, failed to detonate with a detonator containing 0.10 gm of lead azide and 0.80 gm of pentaerythritol tetranitrate.

EXAMPLE 11

The following mixture was milled for 1 hour in equipment as described in Example 1:
70.5 gm ammonium nitrate (300 micron)
14.0 gm water
0.4 gm sodium carboxymethyl cellulose (ex.ICI)

The powder, which contained ammonium nitrate particles of 10 micron diameter, was then mixed with:
5.0 gm paint grade aluminium
7.0 gm atomised grade aluminium
2.5 gm pre-gelled maize starch
0.5 gm guar gum
0.1 gm sodium dichromate The sensitised explosive so obtained had a density of 1.10 gm/ml. In a 32 mm diameter cartridge unconfined at 5° C. it detonated with a detonator containing 0.10 gm of lead azide and 0.10 gm of pentaerythritol tetranitrate and with a velocity of detonation of 4.0 km/s.

Material prepared similarly but in the absence of the sodium carboxymethyl cellulose detonated with the same detonator with a velocity of 3.0 km/s.

The following Examples 12-23 illustrate the application of the invention to the preparation of fluid fertiliser compositions. Parts and percentages quoted are by weight.

EXAMPLE 12

Potassium chloride, in amounts of (i) 100 g, (ii) 200 g and (iii) 300 g respectively, was ground by ball-milling for 3 days in a solution of potassium ferrocyanide (2 g) in water (200 g). In each case, stable, fine particle-size dispersions of the potassium chloride were obtained, of increasing viscosity from (i) through (iii) as shown in the following table (viscosities were determined at a shear rate of about 100 secs.$^{-1}$.

| Formulation | (i) | (ii) | (iii) |
|---|---|---|---|
| Particle size (microns) | up to 2.5 | up to 2.5 | up to 15.5 |
| Viscosity (poise) | 0.1 | 5.1 → 4.3 | 7.2 → 6.2 |

EXAMPLE 13

The formulations (A), (B) and (C) shown below were each ball-milled for 72 hours:

|  | (A) | (B) | (C) |
|---|---|---|---|
| Potassium chloride (fertiliser grade) | 134.81 | 200 | 134.81 |
| Ammonium dihydrogen phosphate | 6.04 | — | 6.04 |
| Diammonium monohydrogen phosphate | 15.38 | — | 15.38 |
| Potassium ferrocyanide | — | 2 | 2 |
| Water | 143.76 | 200 | 143.76 |

In the case of formulation A, that is to say in the absence of any potassium ferrocyanide, no dispersion of the potassium chloride was obtained, there being no significant reduction of the particle size of that material during milling. By contrast, in the case of formulations B and C, free-flowing, fine particle size dispersions were obtained. Any solid material which separated out on standing was readily re-dispersed by gentle agitation.

EXAMPLE 14

The following formulation was ball-milled for 72 hours:

| Urea | 25.00 parts |
|---|---|
| Ammonium dihydrogen phosphate | 6.04 parts |
| Diammonium hydrogen phosphate | 15.38 parts |
| Na$_3$PO$_4$.2H$_2$O | 47.00 parts |
| KCl | 62.82 parts |
| K$_4$Fe(CN)$_6$ | 2.00 parts |
| Water | 143.76 parts |

A very free flowing dispersion was obtained.

EXAMPLES 15-17

The formulations listed below were each milled for 6 hours in a laboratory ball-mill at 60 r.p.m., in a batch size of about 2 Kg:

| Example No. | Potassium chloride, parts | Diammonium phosphate, parts | Ammonium polyphosphate solution,* parts | Water, parts | Potassium ferrocyanide, % based on potassium chloride |
|---|---|---|---|---|---|
| 15 | 70 | — | — | 30 | 0.1 |
| 16 | 52 | — | 48 | — | 0.1 |
| 17 | 39 | 18 | 43 | — | 0.1 |

*an aqueous solution of a mixture of ammonium phosphates and polyphosphates of total concentration about 58%.

Each product was a fine dispersion in which the disperse phase consisted substantially of potassium chloride particles. Each dispersion remained stable, with little or no separation of solid material over a period of several weeks.

EXAMPLES 18–21

Portions of a 5-16-32 fertiliser composition consisting of potassium chloride (51 parts), ammonium polyphosphate (47 parts) and water (2 parts), were ground in a laboratory ball-mill for a period of 6 hours in the presence of each of the additives listed below in the proportions stated (based on a charge weight of 2 Kg). The stability of each of the products so obtained was observed in terms of the lack of crystal growth and ease of redispersion.

| Example No. | Additive | Amount, % | Stability |
|---|---|---|---|
| 18 | Polyethylene glycol, mol. wt. 200 | 0.1 | 64 days |
| 19 | Borax | 0.25 | 108 days |
| 20 | Cadmium chloride | 0.1 | 94 days |
| 21 | Lead chloride | 0.1 | up to 104 days |

EXAMPLES 22–23

A mixture of potassium chloride (70 parts) and water (30 parts) was ground in a laboratory ball-mill for a period of 6 hours in the presence of each of the additive compositions listed below in the proportions stated (based on a charge weight of 2 Kg). The stability of the products was observed in terms of lack of crystal growth and ease of re-dispersion.

| Example No. | Additive | Amount | Stability |
|---|---|---|---|
| 22 | Xanthan gum | 0.2 | 73 days |
| 23 | Xanthan gum / Sodium ferricyanide | 0.2 / 0.1 | 77 days |

EXAMPLE 24

"16-16-16" fertiliser compositions were prepared from potassium chloride (26 parts), ammonium polyphosphate solution (47 parts), urea (25 parts) and water (2 parts). Portions containing respectively potassium ferrocyanide (0.1%) and attapulgite clay (2.0%) by weight were ground in a laboratory ball-mill for 4 hours. At a shear rate of 13 secs$^{-1}$ the viscosity of the portion containing potassium ferrocyanide was 2.46 poise compared with 8.27 poise for the portion containing attapulgite clay.

EXAMPLE 25

"14-14-21" fertiliser compositions were prepared from potassium chloride (35 parts), ammonium polyphosphate solution (42 parts), urea (22 parts) and water (2 parts). 2 Kg portions containing respectively potassium ferrocyanide (0.1%) and attapulgite clay (2.0%) by weight were ground in a laboratory ball-mill for 4 hours. At a shear rate of 3 secs$^{-1}$ the viscosity of the portion containing potassium ferrocyanide was 3.86 poise compared with 18.98 poise for the portion containing attapulgite clay.

EXAMPLE 26

"3-9-27" fertiliser compositions were prepared from potassium chloride (44 parts), ammonium polyphosphate solution (26 parts) and water (30 parts). 2 Kg portions containing respectively potassium ferrocyanide (0.1%) and attapulgite clay (2.0%) were ground in a laboratory ball-mill for 4 hours. Over a period of seven days the portion containing potassium ferrocyanide had undergone synaeresis to the extent of 3% compared with 28% for the portion containing attapulgite clay.

We claim:

1. A stable fluid fertilizer suspension of fine crystalline solids in a saturated solution thereof, the suspension being based essentially on potassium chloride and an ammonium phosphate and being prepared by a process which comprises comminuting to an average particle diameter of less than about 45 microns a solid substance containing potassium chloride and ammonium phosphate, by grinding it in the presence of a saturated solution of the solid substance in a liquid in which the solid has a solubility greater than 1% by weight, the mixture of the solution and the solid being in fluid condition with the solid being a separate phase during grinding and the solution having dissolved therein an additive which is a crystal growth inhibitor for the solid whereby crystal growth is inhibited at both existing crystal surfaces and new crystal surfaces created by the breaking down of relatively coarse particles, the additive being selected from the group consisting of the ferrocyanides and ferricyanides of sodium or potassium, borax, cadmium chloride and lead chloride.

2. A fertilizer composition as in claim 1 wherein the amount of additive employed is at least 0.05% of the total weight of the solid present in the mixture being comminuted, including that dissolved in the liquid.

3. A fluid fertilizer composition as in claim 1 wherein said saturated solution is a saturated aqueous solution.

4. A fluid fertilizer composition as in claim 2 wherein said saturated solution is a saturated aqueous solution.

* * * * *